Dec. 14, 1926.
O. A. EBERHARDT
PISTON PACKING
Filed Dec. 10, 1924
1,610,269
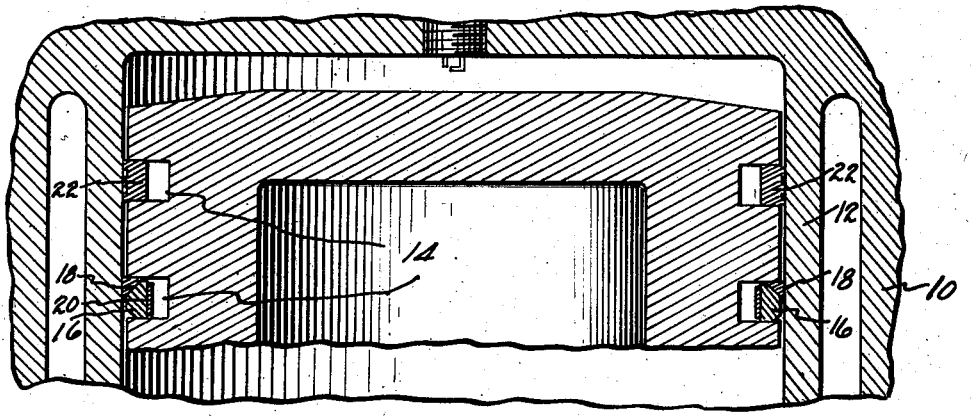
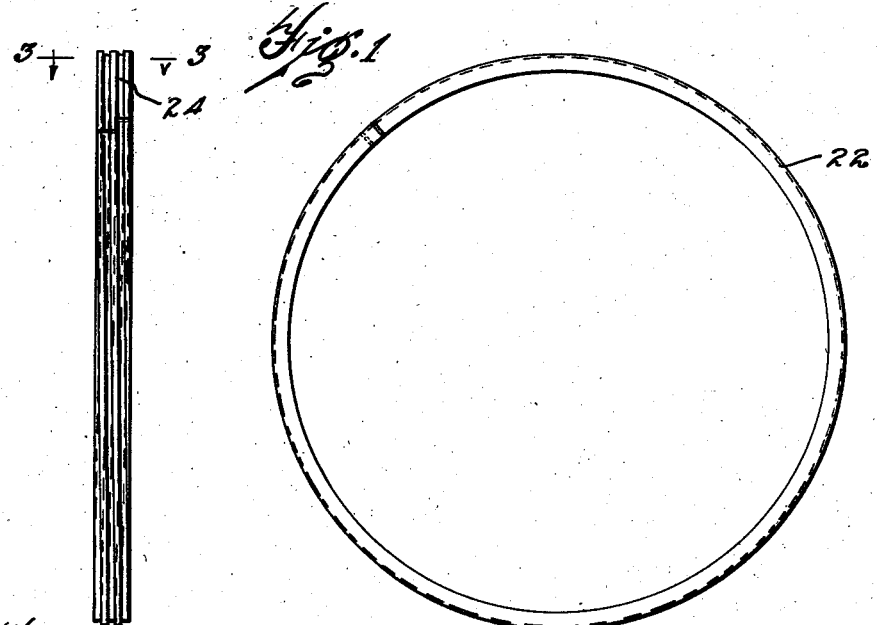
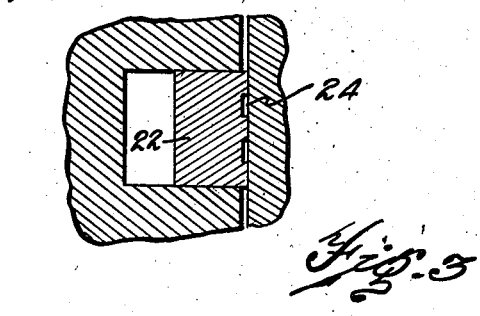
INVENTOR.
Oscar A. Eberhardt
BY Parker & Burton.
ATTORNEY.

Patented Dec. 14, 1926.

1,610,269

UNITED STATES PATENT OFFICE.

OSCAR A. EBERHARDT, OF DETROIT, MICHIGAN.

PISTON PACKING.

Application filed December 10, 1924. Serial No. 754,932.

My invention relates to piston packing.

The object is to produce an expansible one-piece snap piston ring readily adaptable to conform to the cylinder within which the piston is mounted and so constructed as to prevent formation of a vacuum below the ring and above the packing ring spaced therebelow, yet capable of preventing leakage of compression during operation.

In the use of an ordinary snap ring about a cylinder and spaced above a snugly fitting substantially leak-proof ring it frequently happens that a vacuum is formed between the two rings and in the operation of the piston a knock is produced. My improved ring is provided on its peripheral surface with a passageway through which gases may slowly pass, however, the restraint offered to their passage is such as to prevent any appreciable leakage of compression during the working stroke or the formation of any substantial vacuum. In the combination hereinafter described a packing is provided which is unusually effective in performance and readily adaptable to overcome an irregular condition of the cylinder.

In the drawings:

Fig. 1 is a broken away vertical sectional view through a cylinder and piston provided with my invention.

Fig. 2 is a side elevation of my improved piston ring.

Fig. 3 is a cross-sectional view taken on line 3—3, Fig. 2.

Fig. 4 is a fragmentary sectional view through a piston and cylinder showing packing rings in position.

My improved ring is adapted to serve the purpose of an effective quick seating packing ring in any conventional piston and cylinder construction, but it is intended particularly to be used in the upper groove of a piston provided with a plurality of spaced-apart grooves in the lower groove or grooves of which particularly effective leak-proof rings are employed, and I have illustrated my invention in a one-piece snap ring seated in the upper groove with a piston ring of the character illustrated in application Serial No. 432,693, of Alfred A. Panyard, filed December 23, 1920, seated in the lower groove.

In the drawing, the cylinder illustrated in broken away cross-section in Fig. 1 is indicated as 10 and the piston mounted to travel therein as 12. The piston is provided with suitable spaced-apart ring grooves 14, two upper grooves being shown in the drawing. In the lower ring groove is located a ring of the character described in the application above identified. This ring is so constructed as to provide a tight joint with the walls of the groove and the wall of the cylinder and leakage of compression or pumping of oil is positively prevented.

This ring in the lower groove comprises a pair of cooperating wedge ring sections 16 and 18, one of which initially overhangs the other to engage the cylinder wall to the exclusion of such other for a limited initial period of wear. The lower ring section 16 seats upon a spring 20, which spring in turn due to its corrugated shape seats at a plurality of points against the bottom of the groove in the piston.

This construction results in the ring sections being held outwardly against the cylinder wall and against the side walls of the groove and provides a stable, resilient base for the packing which exerts a constant uniform outward pressure thereon.

In the upper groove in the piston there is seated a one-piece snap ring stepped at the joint and embodying my invention. This ring is provided with a narrow spiral groove which preferably extends a plurality of times about its circumference and terminates on opposite sides of the ring. The groove affords a restricted passageway for the escape of gas, but due to the narrow width of the groove and its length in encircling the ring, the flow of gas therethrough is restrained so that there is no leakage of compression during the working stroke. A spiral groove, however, offers less obstruction to the passage of gas than is offered around the ring within the packing groove, so that the normal tendency of the gas to force its way around and in back of the ring is greatly minimized. My improved ring offers a narrow wearing face to the cylinder wall and thereby quickly seats itself within the cylinder.

During operation the improved snap ring seated in the upper groove in combination with the ring construction shown as seated in the lower groove provides a packing which while peculiarly effective is such as to prevent formation of a vacuum between the two rings and permits the slow passage of gas through the spiral groove of the ring 22. The spiral groove 24 is shown as extending about the circumference of the ring a plurality of times and the opposite ends of the groove terminate on opposite sides of the ring.

What I claim is:

1. In piston packing, a cylinder, a piston mounted therein and having a groove for packing and a packing ring in said groove provided on its cylinder wall engaging surface with a relatively narrow spiral groove extending a plurality of times about the circumference of the ring and having its opposite ends terminating on opposite sides of the ring.

2. In piston packing, a cylinder, a piston mounted therein and having spaced-apart grooves for packing, suitable relatively tight packing in the lower groove, and a packing ring in the upper groove provided with a narrow circumferential spiral groove formed on its outer face extending a plurality of times about the ring and terminating on opposite sides of the ring to provide a restricted vent into the space between the rings.

In testimony whereof, I sign this specification.

OSCAR A. EBERHARDT.